US012775417B2

(12) United States Patent
Leung et al.

(10) Patent No.: US 12,775,417 B2
(45) Date of Patent: Oct. 27, 2026

(54) BUFFER MANAGEMENT

(71) Applicant: Intel Corporation, Santa Clara, CA (US)

(72) Inventors: Ho-Ming Leung, Cupertino, CA (US); Daniel Christian Biederman, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/966,322

(22) Filed: Oct. 14, 2022

(65) Prior Publication Data

US 2023/0045114 A1 Feb. 9, 2023

(51) Int. Cl.
*G06F 12/00* (2006.01)
*G06F 3/06* (2006.01)

(52) U.S. Cl.
CPC .......... *G06F 3/0659* (2013.01); *G06F 3/0622* (2013.01); *G06F 3/0679* (2013.01)

(58) Field of Classification Search
CPC .... G06F 3/0659; G06F 3/0622; G06F 3/0679; G06F 3/0608; G06F 3/064; G06F 3/0656
See application file for complete search history.

(56) References Cited

U.S. PATENT DOCUMENTS

| | | | | |
|---|---|---|---|---|
| 10,067,690 | B1 * | 9/2018 | Matthews | G06F 13/1678 |
| 10,802,965 | B2 | 10/2020 | Stephens et al. | |
| 2002/0129049 | A1 * | 9/2002 | Collins | G06F 3/0608 709/224 |
| 2007/0053349 | A1 * | 3/2007 | Rittmeyer | H04L 49/9063 370/378 |
| 2014/0258769 | A1 * | 9/2014 | Baryudin | G06F 12/0246 711/159 |
| 2016/0216894 | A1 * | 7/2016 | Nango | G06F 3/0604 |
| 2021/0014324 | A1 * | 1/2021 | Chilikin | G06F 1/324 |
| 2022/0188021 | A1 * | 6/2022 | Park | G06F 3/0688 |

OTHER PUBLICATIONS

Shi, Xuanhua et al., “Deca: A Garbage Collection Optimizer for In-Memory Data Processing”, https://dl.acm.org/doi/fullHtml/10.1145/3310361, ACM Trans. Comput. Syst., vol. 36, No. 1, Article 3, Publication date: Mar. 2019, 18 pages.

* cited by examiner

*Primary Examiner* — Arvind Talukdar
(74) *Attorney, Agent, or Firm* — Compass IP Law PC

(57) ABSTRACT

Examples described herein relate to a network interface device comprising an interface to memory and circuitry. In some examples, the circuitry is to: determine a number of data units stored in a page in the memory and based on no data unit stored in a page of memory, permit storage of a data unit in the page in the memory.

20 Claims, 9 Drawing Sheets

BUFFER MANAGEMENT

BACKGROUND

Various storage protocols exist that enable access to storage devices using a network or fabric. For example, the Non-volatile Memory Express over Fabrics (NVMe-oF) specification is designed to enable access to remote NVMe compatible solid state drives (SSDs). For example, NVMe-oF is described at least in NVM Express Base Specification Version 1.0 (2019). NVMe-oF compatible devices provide high performance NVMe storage drives to remote systems accessible over a network or fabric.

In computer systems, memory can be available to store data for access by devices and processor-executed processes. To manage allocation of available memory, garbage collection (e.g., software or hardware consolidation of fragmented data to a contiguous area and free up whole pages for re-use) can be performed to make the aggregate regions of memory space available for use by other processes.

DETAILED DESCRIPTION

Networking or storage interface devices utilize buffers to store packet data prior to transmission or a data write or after packet receipt or a data read. Buffers can be allocated at page level granularity, where a page can include 4096 bytes, 8192 bytes, or other sizes. However, data unit sizes of packet data and associated meta data can be size increments that do not align with page boundaries and data units can occupy a portion of one or more whole pages. For example, a data unit can be 512 bytes+8 metadata bytes, or other sizes. Data units from different contexts or streams can be interleaved in storage and data units can be de-allocated out-of-order, which can result in random empty spaces of different size in the continuous address space.

At least in connection with management of available memory regions in one or more memory devices in, or accessible to, a network interface device or other device, technologies can identify and allocate, or re-allocate, available data units to one or more processes. For example, a data structure can be used to track a number of data units stored or partially stored in a page or other partition and to automatically determine an available page or other partition based on a count of tracked number of data units being zero. In some examples, a data unit can be transmitted as part of an Non-volatile Memory Express over Fabrics (NVMe-oF™) request to a requester or received as part of an NVMe-oF™ request from a responder.

Figure 1:
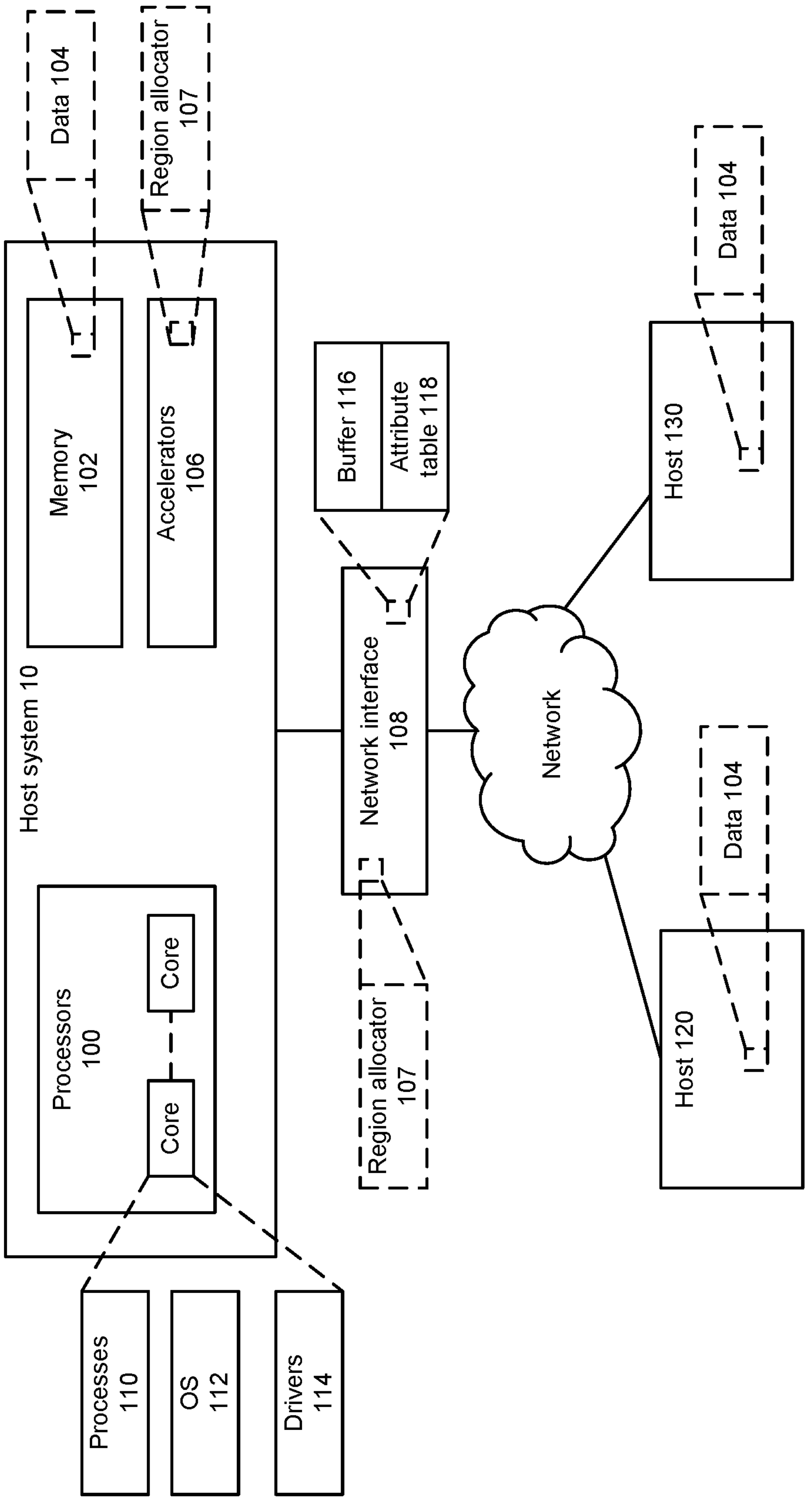
FIG. 1 depicts an example system.

FIG. 1 depicts an example system. Host system 10 can include processors 100 that execute one or more of: processes 110, operating system (OS) 112, or device driver 114. Various examples of hardware and software utilized by the host system are described at least with respect to FIGS. 6 and/or 7. Device driver 114 can include a device driver for network interface device 108. Device driver 114 can include a device driver can issue NVMe commands to an associated NVMe compatible SSD or other storage or memory device. An NVMe command can be executed through a queue pair (qpair) allocated in memory 102 or memory in or accessible to network interface device 108. A queue pair can include a submission queue (SQ) and a completion queue (CQ). For a data read, a read command can be put into an SQ, and a CQ can be used to receive a response (e.g., completion or fail) from one or more storage devices. For a data write, a write command can be written into an SQ, and a CQ can be used to receive a response (e.g., completion or fail) from one or more storage devices. In some examples, device driver 114 can be available from a software development kit (SDK) such as one or more of: NVIDIA® DOCA™, Data Plane Development Kit (DPDK), OpenDataPlane (ODP), Infrastructure Programmer Development Kit (IPDK).

For example, processors 100 can include a central processing unit (CPU), graphics processing unit (GPU), accelerator, or other processors described herein. Processes 110 can include one or more of: application, process, thread, a virtual machine (VM), micro VM, container, microservice, or other virtualized execution environment.

Host 120 and/or host 130 can execute one or more processes (e.g., application, process, thread, a VM, micro VM, container, microservice, or other virtualized execution environment) that communicate with one or more of processes 110 via network interface device 108 and through a network. Host 10, host 120, and/or host 130 can include one or more of: a server, accelerator pool, memory pool, storage pool, or other devices.

In some examples, network interface device 108 can include circuitry to allocate one or more data units worth in buffer 116 in a memory device to store data to be sent to one or more of host 120 or 130 or data received from one or more of host 120 or 130 prior to storage in memory 102. For example, buffer 116 can be used an initiator bounce buffer for NVMe write operations or target bounce buffer for NVMe read operations. In some examples, network interface device 108 can include storage subsystem circuitry to issue or receive NVMe or NVMe-OF commands. Networking protocols for transmission and receipt of data can utilize at least Transmission Control Protocol (TCP) over Internet Protocol (TCP/IP), Remote Direct Memory Access (RDMA), or other protocols.

In some examples, network interface device 108 can utilize region allocator 107 to determine which page or partition of a memory device in memory or storage in or accessible to network interface device 108 stores data units and allocate or deallocate one or more pages of data based on no data unit being stored in memory or storage of or accessible to network interface device 108. Region allocator 107 can determine whether a data unit is stored in a page of buffer 116 or the page is available to be written-to. Network interface device 108 can utilize an NVMe protocol engine to perform region allocator 107 (or that includes region allocator 107) as the NVMe protocol engine can track when data is written to host system 10 or sent to a remote host 120 or 130 based on received NVMe read or write requests and can determine when a data unit corresponding to the received NVMe read or write requests is allocated or re-allocated.

Region allocator 107 can determine which pages in buffer 116 are free or utilized by tracking data unit storage using attribute table 118. Attribute table 118 can indicate a count of partitions (e.g., pages) occupied by data units. Attribute table 118 can identify a consume count of how many data units stored in page and an associate index that identifies pages of starting data address or ending of data units. Region allocator 107 can dynamically identify that a partition is occupied based on a data unit being stored in a partition prior to transmission to host 120 or 130 or prior to storage in memory 102. Region allocator 107 can dynamically identify that a partition has one more stored data unit based on a data unit having been stored in a partition after receipt from host 120 or 130 or memory 102 and an associated consumption count can be incremented by one. Region allocator 107 can dynamically identify that a partition has one fewer stored data unit based on the data unit stored in a partition having been transmitted to host 120 or 130 or read for storage in memory 102 and an associated consumption count can be decremented by one. Based on a data unit count reaching zero for a page, region allocator 107 can identify that the page is available for allocation or re-cycling and further explicit garbage collection action is performed. Region allocator 107 can be implemented as error handling software, in some examples. In some examples, a page can be allocated to store merely packet headers or merely packet payloads. For example, a page can store merely packet headers and another page can store merely packet payloads.

In some examples, OS 112 does not perform garbage collection for deallocated pages in buffer 116. Rather, region allocator 107 can deallocate pages in buffer 116 based on a number of data units stored in a page being zero. Accordingly, a page that does not store a data unit can be reallocated or recycled for use to store at least one data unit (or portion thereof) in attempt to reduce wasted memory. Accordingly, network interface device 108 can reallocate pages or other partitions of a buffer to use to store data (e.g., data 104) transferred to or from host system 10. Although examples are provided with respect to a network interface device, other devices can be used instead or in addition, such as a storage controller, memory controller, fabric interface, processor, and/or accelerator device.

In some examples, a data unit can include storage data and metadata. The metadata could include error correction code (ECC) or other protection information, etc. For example, a 512 byte sector could have 8 bytes of ECC and or 8 bytes of protection information. Metadata could be added or removed by the network interface, possibly in a protocol engine circuitry.

Figure 2:
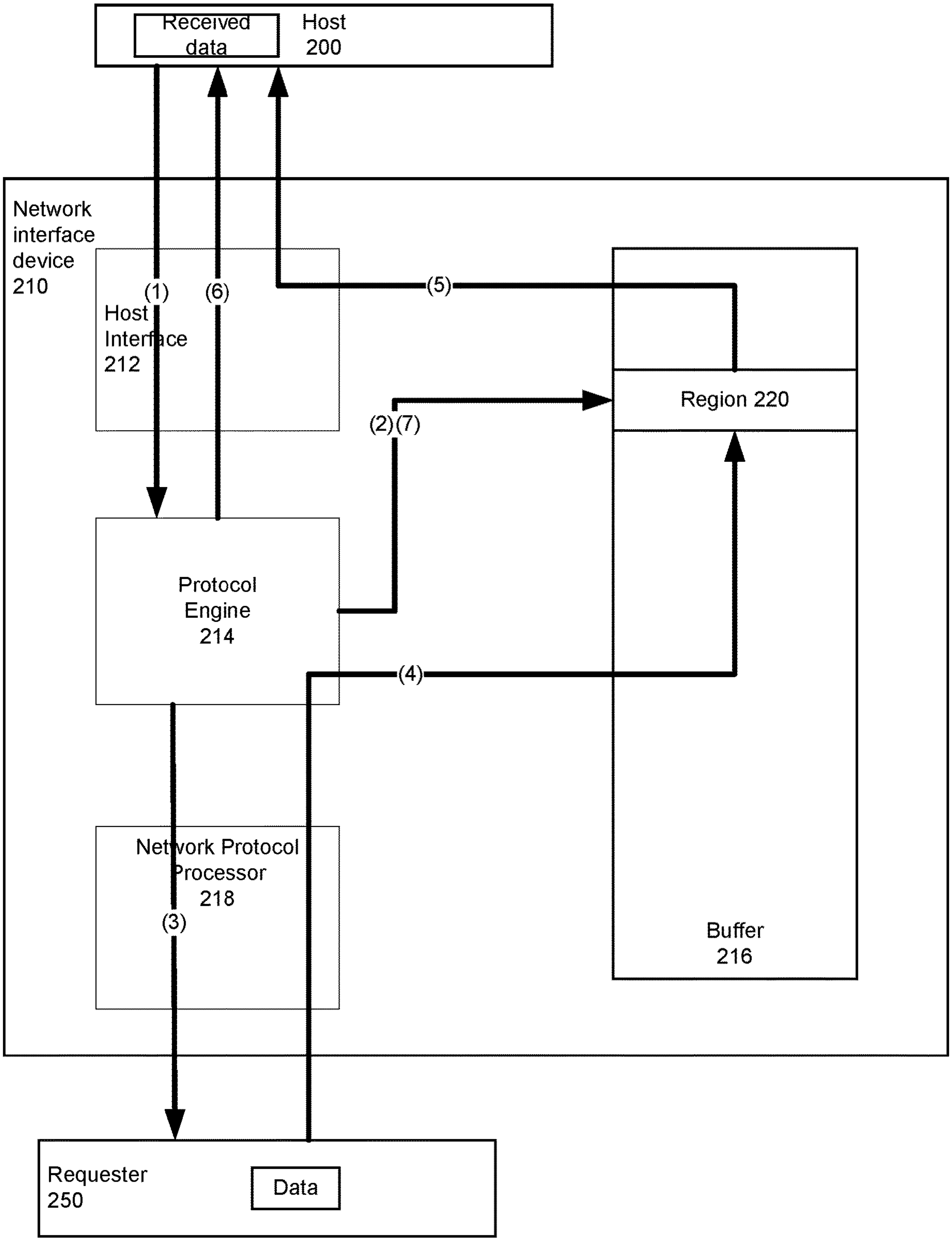
FIG. 2 depicts an example of operations where a network interface is used to buffer data sent by a requester to a host.

FIG. 2 depicts an example of operations where a network interface is used to buffer data sent by a requester to a host. For example, a memory device or storage device of a requester server 250 can transmit data to network interface device 210 at the request of a process executed by host 200. At (1), in response to a read command from a process, operating system, or driver executed by host 200, protocol engine 214 can process the read command. At (2), protocol engine 214 can allocate region 220 in buffer 216 among one or more partitions for data that is to be read from requester 250. For example, buffer 216 can be allocated in a memory device in network interface device 210 or accessible to network interface device 210. For example, region 220 can include at least one data unit and can be large enough to store at least one or more of: at least one packet header, at least one packet payload, at least one packet data, or at least one metadata.

In some examples, protocol engine 214 can be implemented as one or more of: application specific integrated circuit (ASIC), a processor that executes instructions, firmware, field programmable gate array (FPGA), and so forth. In some examples, the read command can be issued by host 200 for transmission by network interface device 210 to requester 250. In some examples, the read command can be consistent with NVMe or NVMe-oF and protocol engine 214 can process the read command based on semantics of NVMe or NVMe-oF.

At (3), network protocol processor 218 of network interface device 210 can issue the read request to requester 250 in one or more packets. At (4), data from requester 250 can be received at network interface device 210, processed by network protocol processor 218, and provided by protocol engine 214 for storage into region 220. Protocol engine 214 can increment a count of data units stored in the region 220. At (5), network interface device 210 can copy (e.g., by direct memory access (DMA)) received data in region 220 to a memory of host 200 via host interface 212 (e.g., PCIe, CXL, or others). Protocol engine 214 can decrement a count of data units stored in the region 220. In some examples, protocol engine 214 can provide a descriptor or other indication of a starting address and length of the data stored to memory of host 200.

At (6), protocol engine 214 can issue a completion response to host 200 to indicate data has been received. For example, the completion response can include an NVMe completion response. At (7), protocol engine 214 can deallocate region 220 to indicate region 220 is available to be overwritten with other data that is read from requester 250 or to be written to requester 250. For example, based on the count of data units being zero, region 220 can be available to store a portion of at least one data unit. In some examples, protocol engine 214 can perform data encryption, data decryption or both on a data transfer to/from buffer 216. In some examples, network protocol processor 218 and/or host interface 212 can perform data encryption and/or decryption.

Figure 3:
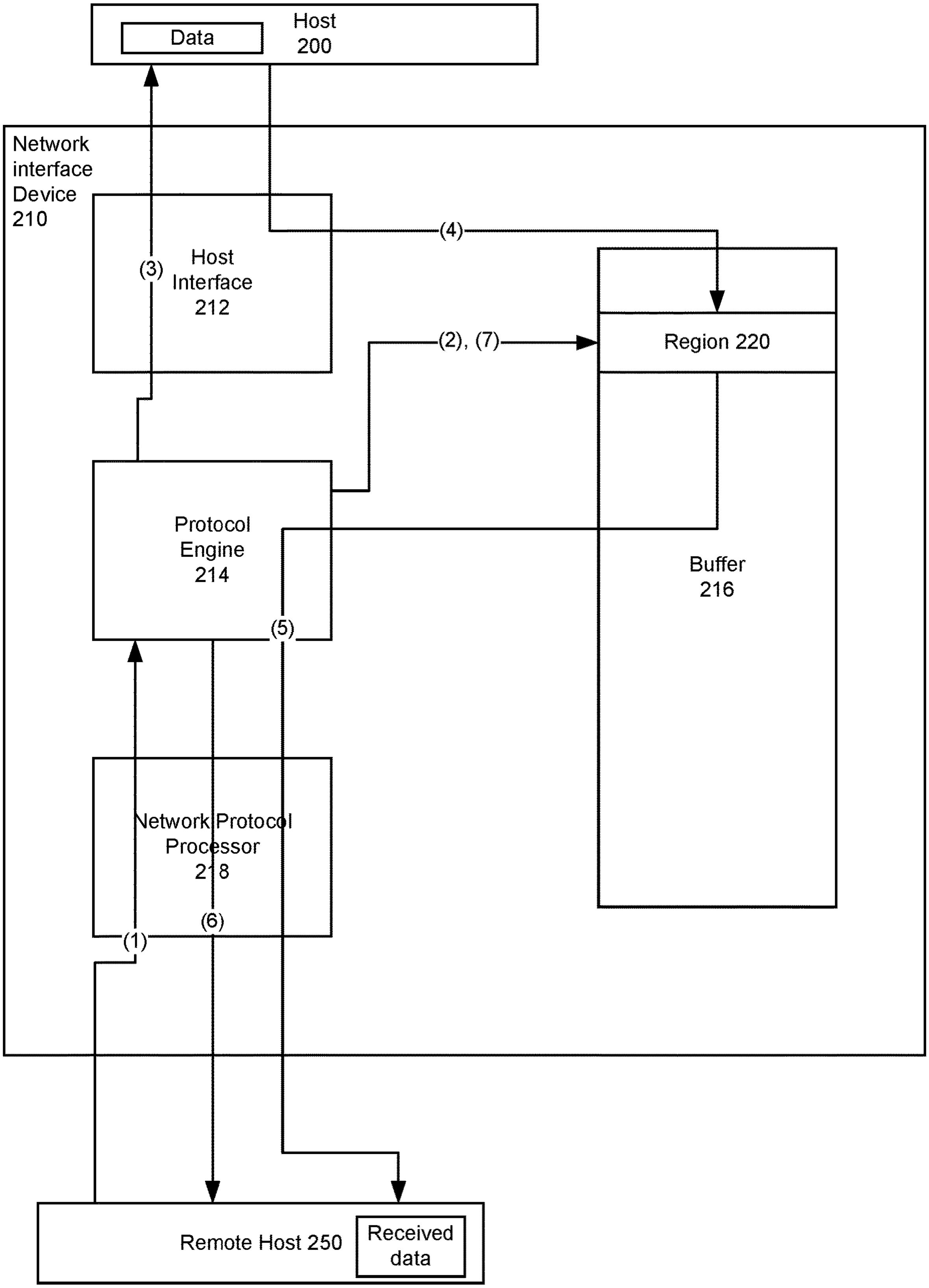
FIG. 3 depicts an example of operations where a network interface is used to buffer data to be transmitted to a requester.

FIG. 3 depicts an example of operations where a network interface is used to buffer data to be transmitted to a requester. At (1), protocol engine 214 can receive a read command from remote host 250 to access data stored by host 200 or a memory or storage device managed by host 200. In some examples, the read command can be received in one or more packets and is consistent with NVMe or NVMe-oF and protocol engine 214 can process the read command based on semantics of NVMe or NVMe-oF. At (2), protocol engine 214 can allocate a region 220 in buffer 216 for data that is to be received from host 200 prior to transmission to host 250. For example, region 220 can include at least one data unit and can be large enough to store at least one or more of: at least one packet header, at least one packet payload, at least one packet data, or at least one metadata.

At (3), protocol engine 214 can issue a data fetch command to host 200 via host interface 212 to request data to be transmitted to remote host 250. For example, a starting address and length of data to be retrieved as well as a pointer to region 220 can be specified. At (4) data can be read from host 200 by DMA circuitry in host 200 or network interface device 210 and provided to region 220. Protocol engine 214 can increment a count of data units stored in the region 220. At (5), data stored in region 220 can be transmitted in one or more packets to remote host 250 by processing by protocol engine 214 and network protocol processor 218. Protocol engine 214 can decrement a count of data units stored in the region 220. Protocol engine 214 can maintain a pointer to region 220 to identify data to be transmitted. For example, based on the count of data units being zero, region 220 can be available to store a portion of at least one data unit.

At (6), protocol engine 214 can cause a response completion indicator to be transmitted to remote host 250. The response completion indicator can be consistent with NVMe, in some examples. At (7), protocol engine 214 can deallocate region 220 to indicate region 220 is available to be overwritten with other data that is read from requester 250 or to be written to requester 250.

Figure 4A:
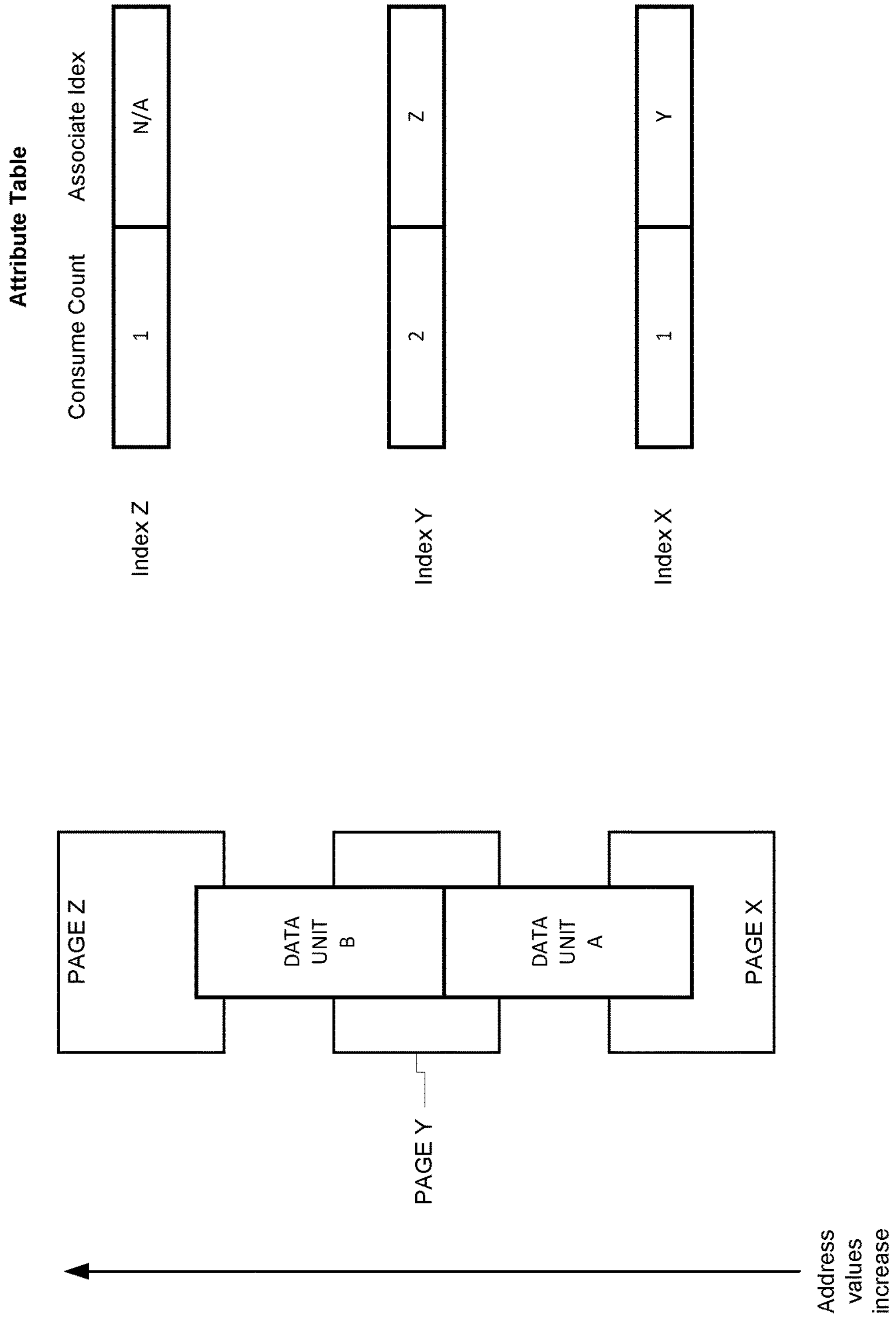
FIG. 4A depicts an example of tracking utilization of a page based on use of an attribute table.

FIG. 4A depicts an example of tracking utilization of a page based on use of an attribute table. Pages can be identified by one or more most significant bits (MSBs) of an address. In this example, a data unit can span up to two pages. In other examples, described herein, a data unit can span more than two pages. Pages X, Y, and Z can represent contiguous or non-contiguous memory address ranges with address values increasing from page X to page Z. A storage or memory controller can assign address ranges to one or more pages. A page can represent 4096 bytes, or other sizes. In this example, two data units (A and B) are stored among three pages (X, Y and Z). For example, data unit A can be stored partly in page X and partly in page Y. For example, data unit B can be stored partly in page Y and partly in page Z. A data unit can include one or more of: packet header, packet payload, data, or metadata.

For one or more pages, an attribute table, accessible by a protocol engine or other circuitry, can track a number of data units that are stored as well as an ending page of the data unit. If a count for starting page of a data is decremented, a count for an ending page of the data unit can also be decremented. For example, a consume count can identify how many data units are stored in a page or other sized partition. For example, an associate index can indicate an ending page identifier for a data unit, that is outside of the particular page.

For example, index X can have an associated consume count of 1 and an associate index of Y to represent that data unit A ends in page Y. When or after data unit A is deallocated or read from a bounce buffer as part of an NVMe read or write, Consume Count of Index X and Index Y can be decremented because data unit A was formerly stored in respective pages X and Y.

For example, index Y can have an associated consume count of 2 and an associate index of Z to represent that two data units are stored in page Y. Associate index of Y can identify page Z as the end of data unit A. When or after data unit B is deallocated or read from a bounce buffer as part of an NVMe read or write, Consume Count of Index Y and Index Z can be decremented because data unit A was formerly stored in respective pages Y and Z.

For example, index Z can have an associated consume count of 1 and an associate index of N/A to represent that one data unit is stored in page Z and page Z is an ending page of a data unit. A next data unit, data unit C (not shown), could be placed immediately after the end of data unit B in page Z.

For data units A and B, a consume count can be incremented for one or more pages based on an associated page index or indices being allocated or the consume count can be decremented based on an associated page index or indices being de-allocated. For example, when or after data stored in a buffer is sent to server (e.g., NVMe-oF initiator or target) such as in (7) of the examples described with respect to FIG. 2 or 3, deallocation of a data unit can take place. After a data unit is deallocated from one or more pages and is available for reuse, the consume count for the one or more pages can be decremented. Based on a consume count for a page reaching zero, the page can be identified as being recyclable and available to be written-to. A page index can return to free memory pool (for re-use) if a counter for the page reaches 0.

Figure 4B:
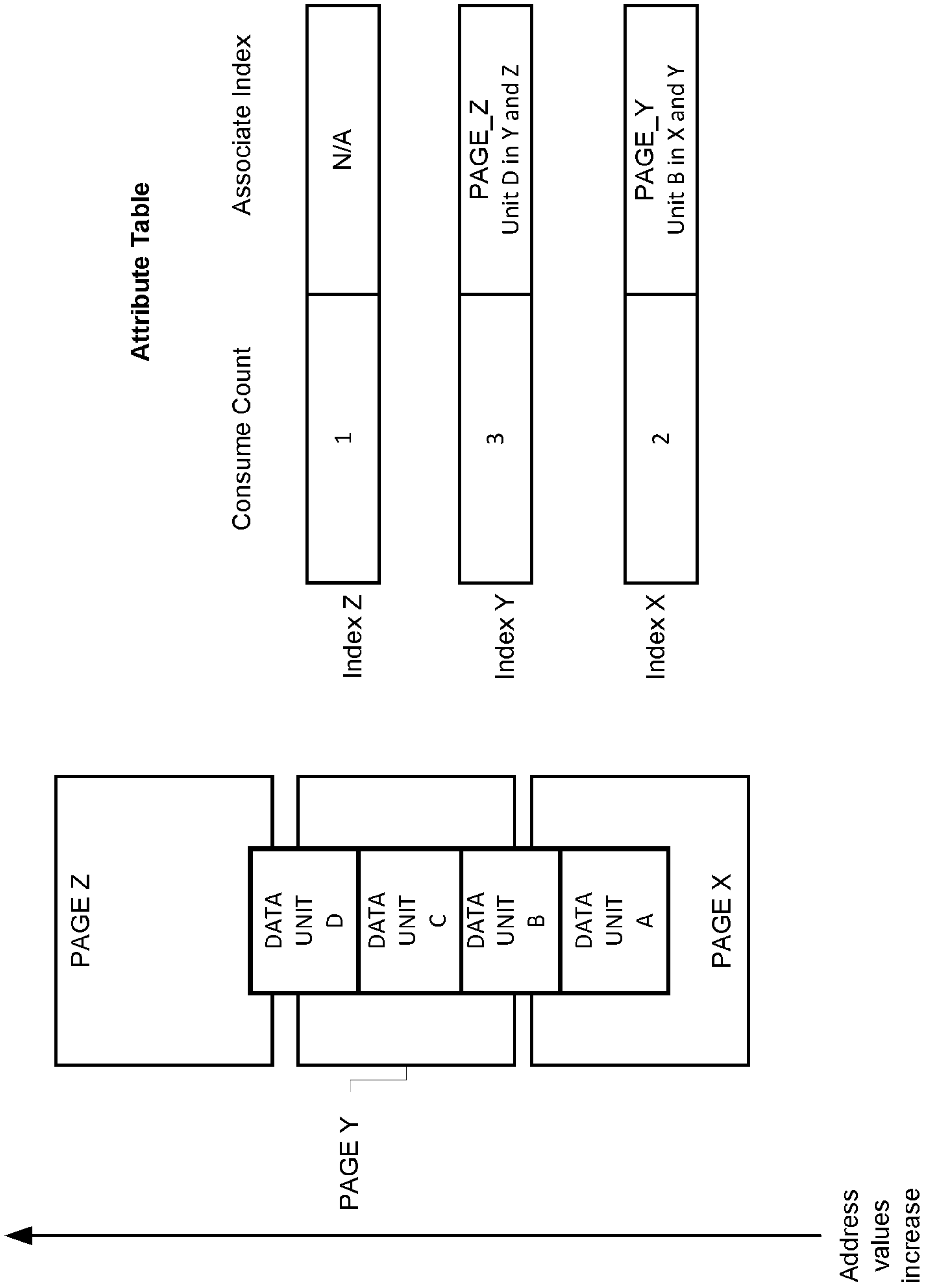
FIG. 4B depicts an example of tracking utilization of a page based on use of an attribute table.

FIG. 4B depicts an example of tracking utilization of a page based on use of an attribute table. In this example, data unit A is stored solely in page X, data unit B is stored in pages X and Y, data unit C is stored solely in page Y, and data unit D is stored in pages Y and Z. Attribute table entry for page Z can identify a consume count of 1 to identify storage of a portion of data unit D and an associate index of N/A as no data starts in page Z and ends in another page. Attribute table entry for page Y can identify a consume count of 3 to identify storage of a portion of data unit D, data unit C, and a portion of data unit B, and an associate index of page Z to indicate an ending of data unit D, which starts in page Y and ends in page Z. Attribute table entry for page X can identify a consume count of 2 to identify storage of a portion of data unit A and a portion of data unit B, and an associate index of page Y to indicate an ending of data unit B, which starts in page X and ends in page Y.

Based on de-allocation of data unit D, Index Y and Z consume count can be decremented as associate index for index Y identifies page Z as an ending page for data unit D. Based on de-allocation of data unit C, Index Y consume count can be decremented. Based on de-allocation of data unit B, Index X and Index Y Consume Count can be decremented. Based on de-allocation of data unit A, Index X Consume Count can be decremented. Based on a consume count for index X, Y, or Z reaching zero, the associated page can be recycled.

Figure 4C:
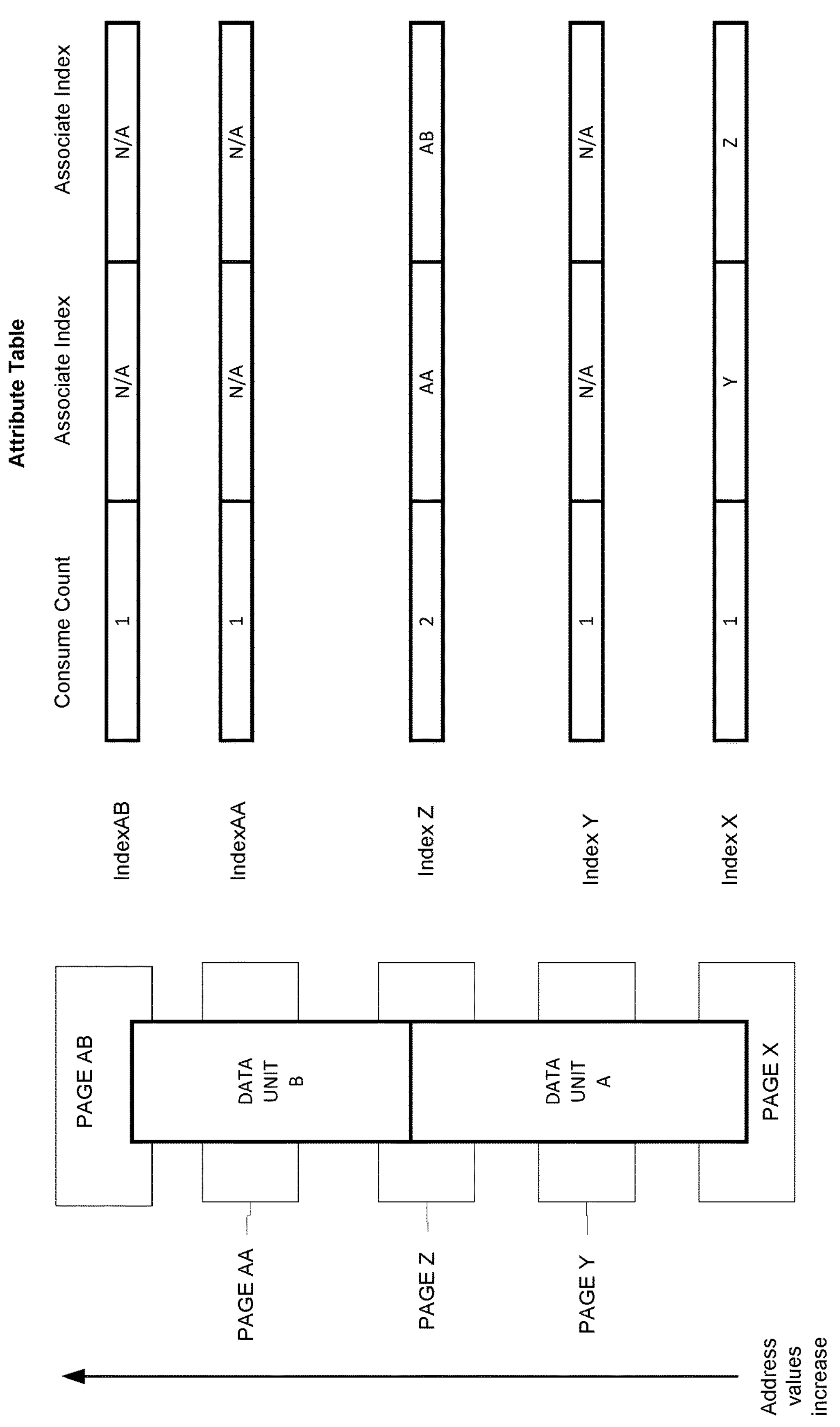
FIG. 4C depicts an example of tracking utilization of a page based on use of an attribute table.

FIG. 4C depicts an example of tracking utilization of a page based on use of an attribute table. A data unit can span more than two pages in this example. Associate indices indicate one or more other subsequent or next page or pages that data in a page also are stored in. In this example, data unit A is stored in pages X, Y, and Z, whereas data unit B is stored in pages Z, AA, and AB. Attribute table entry for page X can identify a consume count of 1 to identify storage of a portion of data unit A and an associate indices of Y and Z to identify pages of data unit A that are stored in in addition to page X. Attribute table entry for page Y can identify a consume count of 1 to identify storage of a portion of data unit A and an associate indices can identify that no data unit starts in page Y. Attribute table entry for page Z can identify a consume count of 2 to identify storage of a portion of data units A and B and an associate indices AA and AB can identify data unit B that starts in page Z also is stored in part in pages AA and AB.

Attribute table entry for page AA can identify a consume count of 1 to identify storage of a portion of data unit and an associate index can identify that no data unit starts in page AA. Attribute table entry for page AB can identify a consume count of 1 to identify storage of a portion of data unit and an associate index can identify that no data unit starts in page AB.

Based on de-allocation of data unit A, Consume Count of indices X, Y and Z can be decremented as associate indices for page X identify pages Y and Z as also storing data unit A. Based on de-allocation of data unit B, Consume Count of indices Z, AA, and AB can be decremented as associate indices for page Z identify pages AA and AB as also storing data unit B. Based on a consume count for index X, Y, Z, AA, or AB reaching zero, the associated page can be recycled.

Figure 5:
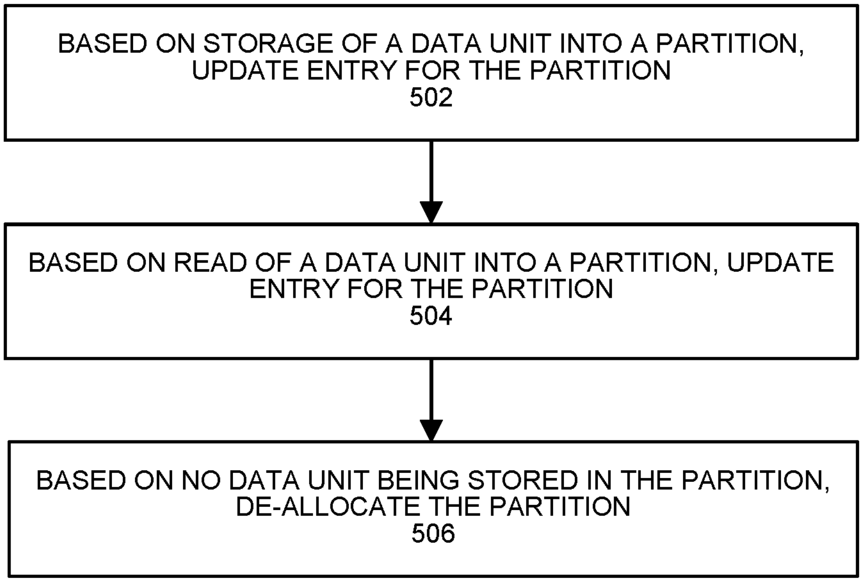
FIG. 5 depicts an example process.

FIG. 5 depicts an example process. The process can be performed by a protocol engine (e.g., NMVe-oF) that processes of NVMe read or write requests and causes NVMe read or write requests to be performed. The protocol engine can be part of a network interface device, accelerator, storage controller, artificial intelligence engine, or other device. At 502, based on storage of data unit into a partition, a table entry for the partition can be updated to indicate a number of data units stored in the partition. A partition can include a page or other sizes of data. For example, a number of data units stored in the partition can be incremented. In some examples, a starting address of a data unit that does not start in the partition can be identified in the table entry.

At 504, based on read of data unit from the partition, a table entry for the partition can be updated to indicate a number of data units stored in the partition. For example, a number of data units stored in the partition can be decremented.

At 506, based on a number of data units stored in the partition being zero, the partition can be de-allocated and available for use to store one or more data units. Garbage collection may not be performed on the partition as de-allocated partitions can be made available for re-use to store one or more data units after de-allocated.

Figure 6:
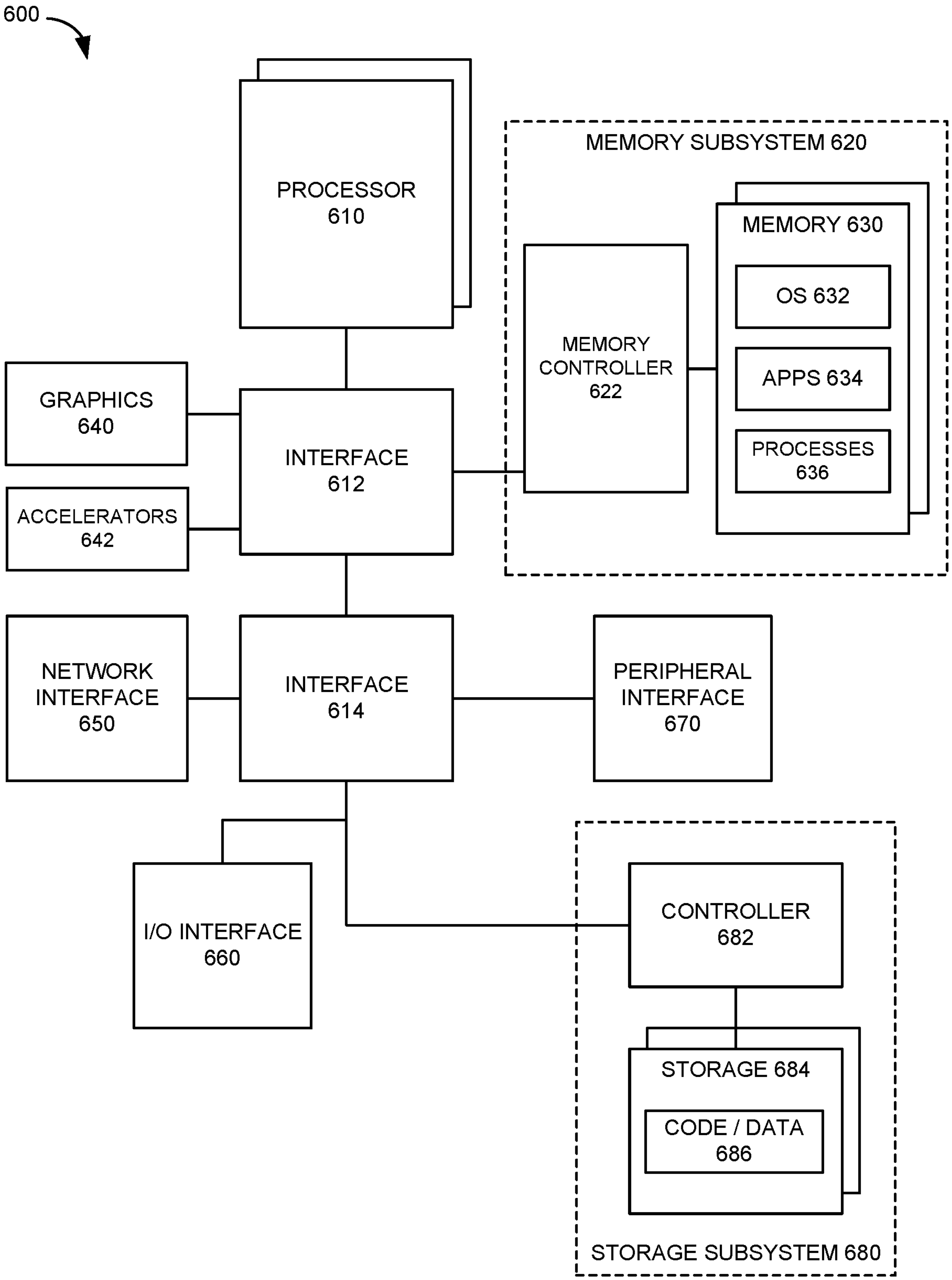
FIG. 6 depicts an example system.

FIG. 6 depicts an example system. Components of system 600 (e.g., processor 610, graphics 640, accelerators 642, memory 630, storage 684, network interface 650, and so forth) can be utilized to perform tracking of data units stored in one or more partitions. System 600 includes processor 610, which provides processing, operation management, and execution of instructions for system 600. Processor 610 can include any type of microprocessor, central processing unit (CPU), graphics processing unit (GPU), processing core, application specific integrated circuit (ASIC), field programmable gate array (FPGA), artificial intelligence (AI) or machine learning (ML) processor, one or more accelerators, or other processing hardware to provide processing for system 600, or a combination of processors. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620 or graphics interface components 640, or accelerators 642. Interface 612 represents an interface circuit, which can be a standalone component or integrated onto a processor die. Where present, graphics interface 640 interfaces to graphics components for providing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Accelerators 642 can be a fixed function or programmable offload engine that can be accessed or used by a processor 610. For example, an accelerator among accelerators 642 can provide compression (DC) capability, cryptography services such as public key encryption (PKE), cipher, hash/authentication capabilities, decryption, or other capabilities or services. In some embodiments, in addition or alternatively, an accelerator among accelerators 642 provides field select controller capabilities as described herein. In some cases, accelerators 642 can be integrated into a CPU socket (e.g., a connector to a motherboard or circuit board that includes a CPU and provides an electrical interface with the CPU). For example, accelerators 642 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 642 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) express bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 600 includes interface 614, which can be coupled to interface 612. In one example, interface 614 represents an interface circuit, which can include standalone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter (e.g., electrical or optical), wireless interconnection components, cellular network interconnection components, USB (universal serial bus), or other wired or wireless standards-based or proprietary interfaces. Network interface 650 can transmit data to a device that is in the same data center or rack or a remote device, which can include sending data stored in memory.

In some examples, network interface device 650 can refer to one or more of: a network interface controller (NIC), a remote direct memory access (RDMA)-enabled NIC, SmartNIC, router, switch, forwarding element, infrastructure processing unit (IPU), data processing unit (DPU), or network-attached appliance. Some examples of network interface 650 are part of an Infrastructure Processing Unit (IPU) or data processing unit (DPU) or utilized by an IPU or DPU. An XPU or xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. A programmable pipeline can be programmed using one or more of: Protocol-independent Packet Processors (P4), Software for Open Networking in the Cloud (SONIC), Broadcom® Network Programming Language (NPL), NVIDIA® CUDA®, NVIDIA® DOCA™, Data Plane Development Kit (DPDK), OpenDataPlane (ODP), Infrastructure Programmer Development Kit (IPDK), ×86 compatible executable binaries or other executable binaries, or others.

In some examples, OS 632 or a driver for network interface device 650 can configure network interface 650 to perform tracking of data units stored in one or more partitions.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, or optical based disks, or a combination. Storage 684 holds code or instructions and data 686 in a persistent state (e.g., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (e.g., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614.

A volatile memory is memory whose state (and therefore the data stored in it) is indeterminate if power is interrupted to the device. Dynamic volatile memory uses refreshing the data stored in the device to maintain state. A non-volatile memory (NVM) device is a memory whose state is determinate even if power is interrupted to the device.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 600 can be implemented using interconnected compute sleds of processors, memories, storages, network interfaces, and other components. High speed interconnects or device interfaces can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (ROCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), Universal Chiplet Interconnect Express (UCIe), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe (e.g., Non-Volatile Memory Express (NVMe) Specification, revision 1.3c, published on May 24, 2018 or earlier or later versions, or revisions thereof).

Communications between devices can take place using a network that provides die-to-die communications; chip-to-chip communications; chiplet-to-chiplet communications; circuit board-to-circuit board communications; and/or package-to-package communications. A die-to-die communications can be consistent with Embedded Multi-Die Interconnect Bridge (EMIB) or utilize an interposer.

Figure 7:
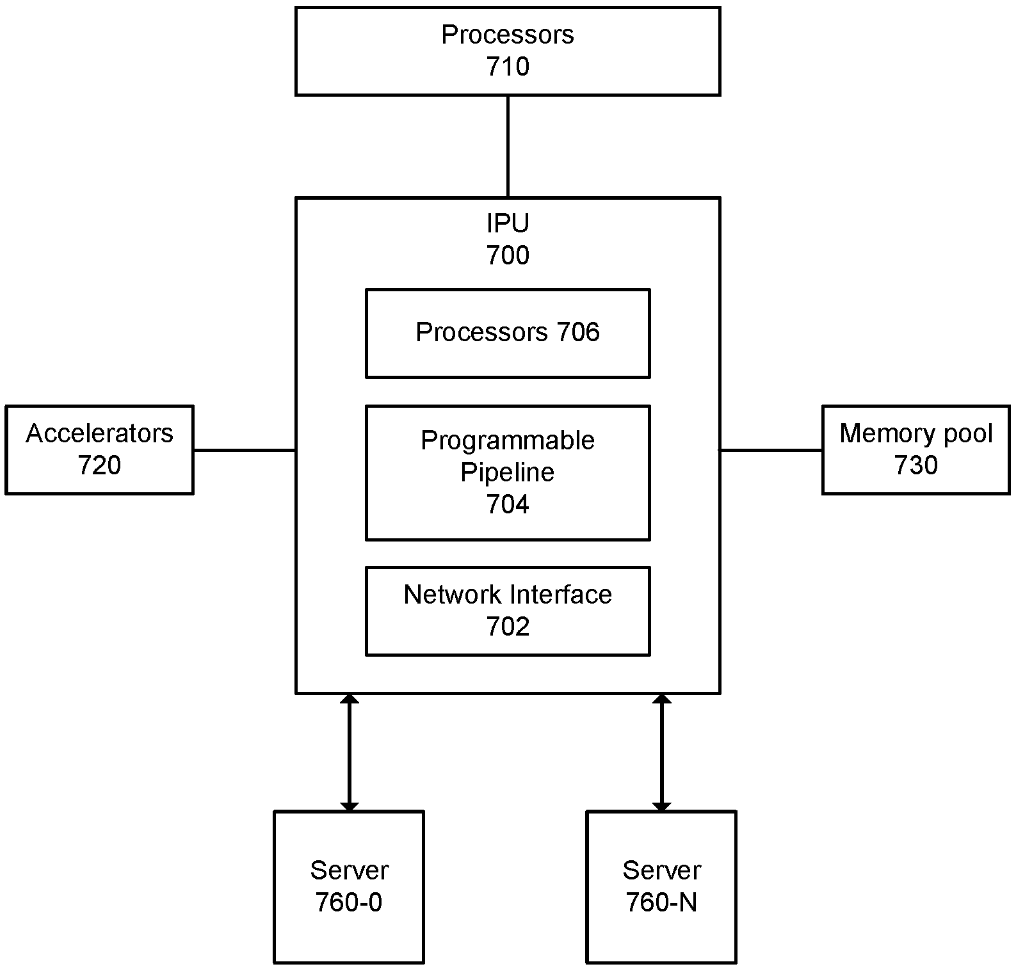
FIG. 7 depicts an example system.

FIG. 7 depicts an example system. In this system, IPU 700 manages performance of one or more processes using one or more of processors 706, processors 710, accelerators 720, memory pool 730, or servers 740-0 to 740-N, where N is an integer of 1 or more. In some examples, processors 706 of IPU 700 can execute one or more processes, applications, VMs, containers, microservices, and so forth that request performance of workloads by one or more of: processors 710, accelerators 720, memory pool 730, and/or servers 740-0 to 740-N. IPU 700 can utilize network interface 702 or one or more device interfaces to provide communications among one or more of: processors 710, accelerators 720, memory pool 730, and/or servers 740-0 to 740-N. IPU 700 can utilize programmable pipeline 704 to process packets that are to be transmitted from network interface 702 or packets received from network interface 702. Programmable pipeline 704 and/or processors 706 can be configured to perform tracking of data units stored in one or more partitions.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), micro data center, on-premise data centers, off-premise data centers, edge network elements, fog network elements, and/or hybrid data centers (e.g., data center that use virtualization, serverless computing systems (e.g., Amazon Web Services (AWS) Lambda), content delivery networks (CDN), cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission, or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes one or more examples, and includes an apparatus that includes: a network interface device comprising an interface to memory and circuitry, wherein the circuitry is to: determine a number of data units stored in a page in the memory and based on no data unit stored in a page of memory, permit storage of a data unit in the page in the memory.

Example 2 includes one or more examples, wherein the data unit is sized to include one or more of: packet header, packet payload, packet metadata, error correction codes (ECC), protection information, or metadata.

Example 3 includes one or more examples, wherein the circuitry is to access an attribute table that is to specify a count of data units stored in a particular page.

Example 4 includes one or more examples, wherein the attribute table is to specify at least one other page that is to store a particular data unit stored in the particular page.

Example 5 includes one or more examples, wherein the network interface device comprises circuitry to process read and write requests based on a storage protocol and storage protocol comprises Non-volatile Memory Express over Fabrics (NVMe-oF).

Example 6 includes one or more examples, wherein the data unit is received as part of an Non-volatile Memory Express over Fabrics (NVMe-oF) consistent request from a responder and the data unit is received as part of an Non-volatile Memory Express over Fabrics (NVMe-oF) consistent request from a requester.

Example 7 includes one or more examples, wherein the circuitry is to monitor a number of data units stored in the page and based on the number of data units stored in the page being zero, deallocate the page to allow the page to be available to store a data unit.

Example 8 includes one or more examples, wherein the network interface device comprises one or more of: a network interface controller (NIC), a remote direct memory access (RDMA)-enabled NIC, SmartNIC, router, switch, forwarding element, infrastructure processing unit (IPU), or data processing unit (DPU).

Example 9 includes one or more examples, and includes a server communicatively coupled to the interface, wherein the network interface device is to copy at least one data unit to the server after receipt and transmit at least one data unit from the server to a receiver in at least one packet.

Example 10 includes one or more examples, and includes a data center, wherein the data center comprises the server and at least one storage device to transmit the at least one data unit to the server or receive the at least one transmitted data unit.

Example 11 includes one or more examples, and includes a non-transitory computer-readable medium comprising instructions stored thereon, that if executed by one or more processors, cause the one or more processors to: configure a network interface device with access to a memory to: determine a number of data units stored in a page in the memory and based on no data unit stored in a page of memory, permit storage of a data unit in the page in the memory.

Example 12 includes one or more examples, wherein the configure a network interface device is performed by one or more of: an operating system (OS) or a driver and wherein the configure a network interface device is based on Protocol-independent Packet Processors (P4), Software for Open Networking in the Cloud (SONIC), Broadcom® Network Programming Language (NPL), NVIDIA® CUDA®, NVIDIA® DOCA™, Data Plane Development Kit (DPDK), OpenDataPlane (ODP), or Infrastructure Programmer Development Kit (IPDK).

Example 13 includes one or more examples, wherein the network interface device comprises a protocol circuitry to process read and write requests based on a storage protocol and the protocol circuitry is to perform the determine a number of data units stored in a page in the memory and permit storage of a data unit in the page in the memory and the storage protocol comprises Non-volatile Memory Express over Fabrics (NVMe-oF).

Example 14 includes one or more examples, wherein the data unit is received as part of an Non-volatile Memory Express over Fabrics (NVMe-oF) consistent request from a responder or received as part of an Non-volatile Memory Express over Fabrics (NVMe-oF) consistent request from a requester.

Example 15 includes one or more examples, and includes instructions stored thereon, that if executed by one or more processors, cause the one or more processors to: configure the network interface device to monitor a number of data units stored in the page and based on the number of data units stored in the page being zero, deallocate the page to allow the page to be available to store a data unit.

Example 16 includes one or more examples, and includes a method that includes: in a network interface device:

determining a number of data units stored in a page in a memory and based on no data unit stored in a page of memory, permitting reuse of the page in the memory.

Example 17 includes one or more examples, wherein the determining a number of data units stored in a page in a memory is based on received commands consistent with a storage protocol and wherein the storage protocol comprises Non-volatile Memory Express over Fabrics (NVMe-oF).

Example 18 includes one or more examples, wherein the data unit is received as part of an Non-volatile Memory Express over Fabrics (NVMe-oF) consistent request from a responder or received as part of an Non-volatile Memory Express over Fabrics (NVMe-oF) consistent request from a requester.

Example 19 includes one or more examples, and includes in the network interface device: performing monitoring a number of data units stored in the page and based on the number of data units stored in the page being zero, deallocating the page to allow the page to be available to store a data unit.

Example 20 includes one or more examples, and includes based on storage of a data unit into a particular page, updating an attribute table to specify a count of data units stored in the particular page.

What is claimed is:

1. An apparatus comprising:

a network interface device comprising an interface to memory, a host interface, direct memory access (DMA) circuitry, a network interface, and circuitry, wherein the circuitry is to:

determine a number of data units stored in a page in the memory, wherein the number of data units stored in the page in the memory is based on (1) a number of data units stored in the page in the memory and transmitted in packets and (2) a number of data units received in packets and read from the page in the memory; and based on the determined number of data units stored in the page in the memory being zero, identify the page in the memory as a candidate for recycling and reallocate the page in the memory to permit storage of a data unit in the page in the memory, wherein the data unit includes a packet header and packet payload.

2. The apparatus of claim 1, wherein the data unit includes one or more of: packet metadata, error correction codes (ECC), protection information, or metadata.

3. The apparatus of claim 1, wherein the circuitry is to access an attribute table that is to specify a count of data units stored in a particular page.

4. The apparatus of claim 3, wherein the attribute table is to specify at least one other page that is to store a particular data unit stored in the particular page.

5. The apparatus of claim 1, wherein the network interface device comprises circuitry to process read and write requests based on a storage protocol and storage protocol comprises Non-volatile Memory Express over Fabrics (NVMe-oF).

6. The apparatus of claim 1, wherein:

the data unit is received as part of an Non-volatile Memory Express over Fabrics (NVMe-oF) consistent request from a responder and the data unit is received as part of the NVMe-oF consistent request from a requester.

7. The apparatus of claim 1, wherein the circuitry is to monitor the number of data units stored in the page and based on the number of data units stored in the page being zero, deallocate the page to allow the page to be available to store the data unit.

8. The apparatus of claim 1, wherein the network interface device comprises one or more of: a network interface controller (NIC), a remote direct memory access (RDMA)-enabled NIC, SmartNIC, router, switch, forwarding element, infrastructure processing unit (IPU), or data processing unit (DPU).

9. The apparatus of claim 1, comprising a server communicatively coupled to the network interface device, wherein the network interface device is to copy at least one data unit to the server after receipt of the at least one data unit and transmit at least one data unit from the server to a receiver in at least one packet.

10. The apparatus of claim 9, comprising a data center, wherein the data center comprises the server and at least one storage device to transmit the at least one data unit to the server or receive the at least one transmitted data unit.

11. At least one non-transitory computer-readable medium comprising instructions stored thereon, that if executed by one or more processors, cause the one or more processors to:

configure a network interface device with access to a memory to:

determine a number of data units stored in a page in the memory, wherein the number of data units stored in the page in the memory is based on (1) a number of data units stored in the page in the memory and transmitted in packets and (2) a number of data units received in packets and read from the page in the memory; and based on the determined number of data units stored in the page in the memory being zero, identify the page in the memory as a candidate for recycling and reallocate the page in the memory to permit storage of a data unit in the page in the memory, wherein the data unit includes a packet header and packet payload and wherein the network interface device comprises a host interface, direct memory access (DMA) circuitry, and a network interface.

12. The non-transitory computer-readable medium of claim 11, wherein the configure the network interface device is performed by one or more of: an operating system (OS) or a driver and wherein the configure the network interface device is based on Protocol-independent Packet Processors (P4), Software for Open Networking in the Cloud (SONIC), Broadcom® Network Programming Language (NPL), NVIDIA® CUDA®, NVIDIA® DOCA™, Data Plane Development Kit (DPDK), OpenDataPlane (ODP), or Infrastructure Programmer Development Kit (IPDK).

13. The non-transitory computer-readable medium of claim 11, wherein:

the network interface device comprises a protocol circuitry to process read and write requests based on a storage protocol and the protocol circuitry is to perform the determine the number of data units stored in a page in the memory and permit storage of a data unit in the page in the memory and the storage protocol comprises Non-volatile Memory Express over Fabrics (NVMe-oF).

14. The non-transitory computer-readable medium of claim 11, wherein the data unit is received as part of an Non-volatile Memory Express over Fabrics (NVMe-oF) consistent request from a responder or received as part of an NVMe-oF consistent request from a requester.

15. The non-transitory computer-readable medium of claim 11, comprising instructions stored thereon, that if executed by one or more processors, cause the one or more processors to:

configure the network interface device to monitor the number of data units stored in the page and based on the number of data units stored in the page being zero, deallocate the page to allow the page to be available to store a data unit.

16. A method comprising:

in a network interface device comprising an interface to memory, a host interface, direct memory access (DMA) circuitry, and a network interface:

determining a number of data units stored in a page in the memory, wherein the number of data units stored in the page in the memory is based on (1) a number of data units stored in the page in the memory and transmitted in packets and (2) a number of data units received in packets and read from the page in the memory; and based on the determined number of data units stored in the page in the memory being zero, identifying the page in the memory as a candidate for recycling and reallocating the page in the memory to permitting storage of a data unit in the page in the memory, wherein the data unit includes a packet header and packet payload.

17. The method of claim 16, wherein the determining the number of data units stored in the page in the memory is based on received commands consistent with a storage protocol and wherein the storage protocol comprises Non-volatile Memory Express over Fabrics (NVMe-oF).

18. The method of claim 16, wherein the data unit is received as part of an Non-volatile Memory Express over Fabrics (NVMe-oF) consistent request from a responder or received as part of an NVMe-oF consistent request from a requester.

19. The method of claim 16, comprising:

in the network interface device:

performing monitoring the number of data units stored in the page and based on the number of data units stored in the page being zero, deallocating the page to allow the page to be available to store a data unit.

20. The apparatus of claim 1, wherein the circuitry is to:

track access to a second data unit stored across multiple pages and based on the second data unit having been transmitted or read to a host, reallocate the multiple pages to permit storage of at least one data unit in at least one of the multiple pages.

* * * * *